(No Model.)

M. C. WALLING.
COTTON PICKER.

No. 313,139. Patented Mar. 3, 1885.

WITNESSES
F. L. Ourand.
J. S. Walling

INVENTOR
Mary C. Walling

UNITED STATES PATENT OFFICE.

MARY C. WALLING, OF BRENHAM, TEXAS.

COTTON-PICKER.

SPECIFICATION forming part of Letters Patent No. 313,139, dated March 3, 1885.

Application filed November 26, 1884. (No model.)

*To all whom it may concern:*

Be it known that I, MARY C. WALLING, a citizen of the United States, residing at Brenham, in the county of Washington and State of Texas, have invented a new and useful Hand Cotton-Picker, of which the following is a specification.

My invention relates to certain new and useful improvements in cotton-harvesters to be operated by hand.

Previous to my invention various means have been employed to facilitate the harvesting of cotton, and at the same time overcome the labor and waste incident to the primitive method of plucking said product from the bolls by hand; but none of the means heretofore brought into use have been found adequate for the purpose named, owing in a measure to their complicated and consequent expensive construction, as well as their imperfect operation and inability to satisfactorily perform the work for which they were designed.

The object, therefore, of my invention is to provide a light, simple, and easily-constructed cotton-picking device, capable of being operated by hand, and which can be manufactured and placed upon the market at a low cost to the purchaser, who, by the employment of the same, is enabled to gather the cotton fiber from the bolls without regard to the height of the stalks, and at the same time such portions of the product that may have become detached from the bolls and fallen to the ground can be gathered up without the necessity of excessive stooping, as is usually the case, such excessive stooping being detrimental to the health and strength of the picker, the employment of a device constructed in accordance with my invention effecting a great saving in the harvesting of such portions of the cotton as are generally left in the field to waste.

My invention consists of a rod, preferably jointed, made from wood or other suitable material, of any desired length or thickness, having joined thereto and extending therefrom at its forward portion auxiliary rods or arms, which, in conjunction with said main rod, form a frame, and suitable wires passed through the frame-pieces in both a vertical and a horizontal direction to form fingers or forks upon which to impale the cotton, said wires being preferably arranged in pairs twisted together and bent to assume a fork shape, those arranged in a vertical plane being turned up at their lower extremities to form hooks, the details of construction and application of the device being hereinafter more fully described with reference to the accompanying drawings, making part of this specification, in which—

Figure 1:
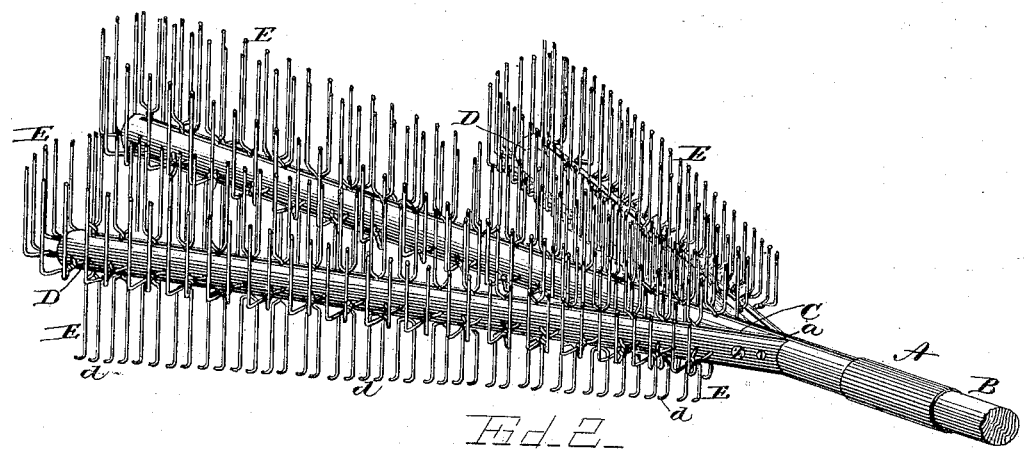
Figure 2:
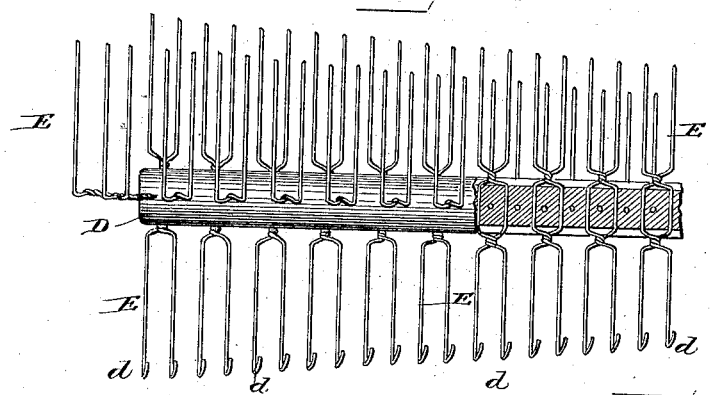
Figure 3:
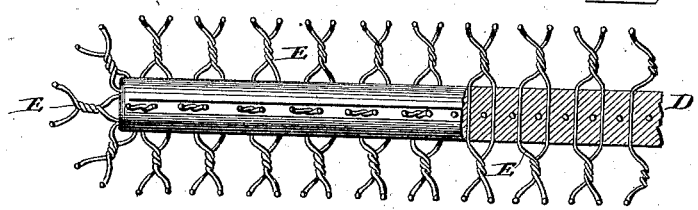

Figure 1 is a perspective view of my invention with the handle broken away. Fig. 2 is a detail side view partly in vertical section of one of the frame-pieces, and Fig. 3 a similar view from the under face.

C represents a main rod, of wood or other suitable material, preferably jointed at A to a handle, B, of any desirable length, so that the implement may be more conveniently packed for storage or transportation. At $a$ the part C is cut away or notched upon each side to admit of the beveled ends of auxiliary rods or arms D D, being joined with their rear faces flush thereto, these latter rods or arms extending in a forward direction at an oblique angle to the main one or body piece, to which they are firmly riveted or otherwise secured at the point of juncture, and in conjunction therewith form a frame of a triangular shape, increasing in width from rear to front. The main rod or body piece C and the auxiliary rods or arms D D are each pierced vertically and horizontally with two series of perforations, about equidistant apart throughout their entire lengths. Through these perforations are passed wires E, of any desirable length and suitable rigidity, with their extremities brought to a point of extreme sharpness. These wires are arranged in pairs, and twisted together upon each side of the frame-pieces, from which they project, and then so bent as to assume the shape of a fork, said forks being graduated in length so as to be the shortest at the rear of the frame and increase toward the forward end.

For the purpose of economy in manufacture, as well as to have the twist of the wire forming the forks come close to the frame-pieces, I channel or form grooves in said pieces upon their upper and lower faces, although this construction may be modified without departing from the essential features of the invention.

The wires passed through the frame-pieces in a vertical direction are turned up at their lower extremities to form hooks d, while those running in a horizontal direction are bent beyond their twists so as to assume a position parallel with those upon a vertical plane.

In the operation of my invention, the implement is grasped by the hand so as to bring the plain-pointed wires in a direction toward the cotton-stalks, when by a raking motion in a downward direction the fiber is stripped entirely from the bolls in an easy and rapid manner, said fiber collecting upon the teeth and frame.

As the implement becomes full and heavy from the accumulating fiber, the latter is discharged into a basket or other receptacle by a slight shake, leaving the picker clean and ready for a repetition of the operation.

In the event of fiber having fallen from the bolls to the ground, as is frequently the case, the same is gathered up by the hook-shaped wires upon the reverse side from those having plain points, this operation being performed without stooping and without waste of time or strength, thereby saving much of the fiber which usually goes to waste.

By the employment of a cotton-picker such as I have described, the cotton crop may be gathered with greater ease and fewer hands than heretofore, and at the same time effect a saving of time, expense, waste, and labor.

Having now described my invention, what I claim, and desire to secure by Letters Patent, is—

1. A cotton-picker consisting of a main rod, auxiliary rods or arms extended from the forward portion of the same, and wire teeth connected to said rods, and arranged in the manner substantially as and for the purpose set forth.

2. A cotton-picker consisting of a main rod, auxiliary rods or arms extended from the forward portion of the former in an oblique direction, and wire teeth connected to said rods and arranged in the manner and for the purpose specified.

3. A cotton-picker consisting of a main rod, auxiliary rods or arms extended from the former in an oblique direction, and two series of sharp-pointed wires passed through said rods at right angles to each other and the adjacent teeth in each series, then bent and twisted together to form forks, substantially as and for the purpose described.

4. A cotton-picker consisting of a main rod having the upper and under faces of its forward portion channeled or grooved, auxiliary rods or arms also channeled or grooved upon their upper and under faces and extended in an oblique direction from the main rod, and sharp-pointed wires passed through perforations in the rods. then twisted together in pairs and bent in the manner and for the purpose specified.

5. The cotton-picker herein described, consisting of a main rod, its rear portion forming a handle and its forward portion a body-piece of the picker, auxiliary rods or arms joined to and extending in an oblique direction from the forward portion of the main rod, said main and auxiliary rods being channeled upon their upper and under faces and provided with two series of perforations at right angles to each other, and sharp-pointed wires secured in the perforations and their extended portions twisted together in pairs, those passing vertically through the rods bent up at their lower extremities to form hooks, and those horizontally arranged bent beyond the twist to a position parallel with those upon a vertical plane, substantially as shown and described.

In testimony that I claim the foregoing I have hereunto subscribed my name in the presence of two witnesses.

MARY C. WALLING.

Witnesses:
WILLIAM A. COOK,
C. S. BUNDY.